W. TODD.
Cane-Stripper.
No. 42,241. Patented Apr. 5, 1864.
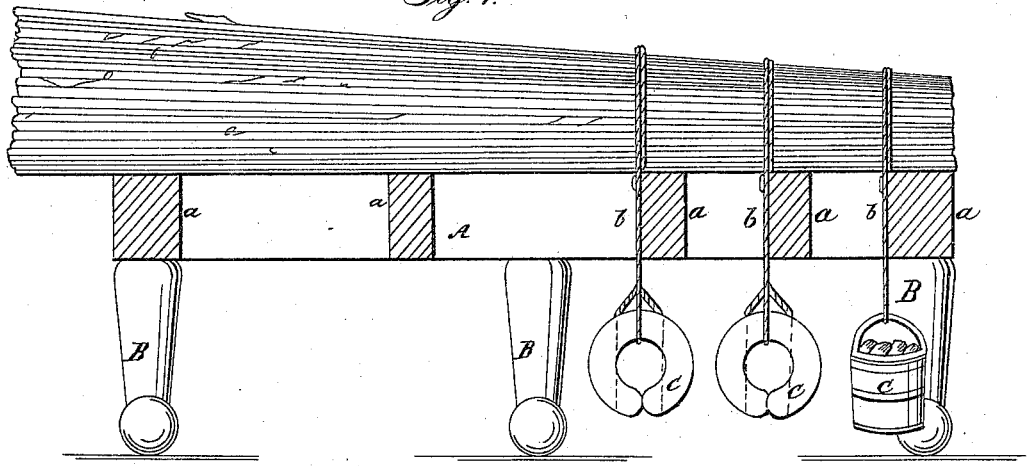
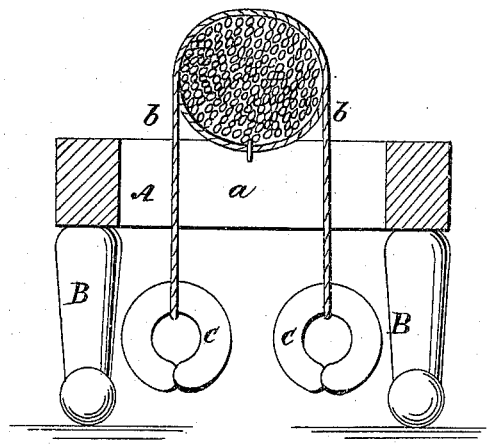
Witnesses:
J. W. Coombs
G. W. Reet
Inventor:
Wm Todd
per Munn & Co
Attorneys

UNITED STATES PATENT OFFICE.

WILLIAM TODD, OF BARNESVILLE, OHIO.

IMPROVEMENT IN CANE-STRIPPERS.

Specification forming part of Letters Patent No. 42,241, dated April 5, 1854.

*To all whom it may concern:*

Be it known that I, WILLIAM TODD, of Barnesville, in the county of Belmont and State of Ohio, have invented a new and useful Improvement in Cane-Strippers; and I do hereby declare that the following is a full, clear, and exact description of the same, reference being had to the accompanying drawings, forming a part of this specification, in which—

Figure 1 represents a longitudinal vertical section of my invention. Fig. 2 is a transverse vertical section of the same.

Similar letters of reference in both views indicate corresponding parts.

The ordinary method of stripping the leaves from the stalks of sorghum and other sugar cane is effected by taking hold of the stalk with one hand and tearing off the leaves with the other.

To supersede this necessarily slow and tiresome process is the object of my invention, which consists in stripping the leaves from the stalks of sorghum or sugar cane by compressing firmly a quantity of cane into a large bundle and pulling one stalk after the other out of the bundle, the pressure being kept up constantly by weights, or their equivalents, so that by the act of pulling out the stalks the leaves are stripped off, and the operation of stripping can be performed with much less trouble and labor and more perfectly than in the ordinary manner.

To enable those skilled in the art to make and use my invention, I will proceed to describe it.

A represents a frame or platform, made of wood or any other suitable material, and supported by legs B at any convenient height from the ground. The platform may be solid and perforated at certain intervals with holes, or it may be made of a series of cross-bars, *a*, placed at such a distance apart that ropes *b* will conveniently and freely pass through between them.

A cart or wagon load of cane just cut from the field is dumped upon the platform A, and two or three ropes, *b*, are passed around the bundle at short intervals and drawn up tight by means of weights *c*, or in any other convenient manner, whereby a continuous pressure is produced and the cane is drawn together sufficiently tight for the occasion. Then one stalk after the other is grasped near its top end and drawn out as fast as it can be effected, and by this action all the leaves are stripped off to perfection. By the action of the weights *c* a continuous strain is effected on the ropes, drawing them up tight whenever one of the stalks has been drawn out, and the whole bundle can thus be stripped without interruption. Furthermore, by my process all the leaves are removed, whereas by the ordinary hand process many leaves are imperfectly stripped off and dry leaves, introduced with the stalks into the mill, absorb a quantity of the juice and reduce the yield, and green leaves, when passing through the mill with the stalks, yield a green acid sap which is detrimental to the juice or sirup.

Having thus fully described my invention, what I claim as new, and desire to secure by Letters Patent, is—

The within-described process of stripping the leaves from the stalks of sorghum or sugar cane by compressing a quantity of cane by means of ropes *b* and weights *c*, or their equivalents, and drawing one stalk after the other out of the bundle, substantially in the manner shown and described.

WM. TODD.

Witnesses:
  B. MACKALL,
  R. M. GUNNING.